Feb. 16, 1965   R. C. RIKE   3,169,372
MASTER CYLINDER PRIMARY CUP ANTI-EXTRUSION MECHANISM
Filed June 27, 1963

INVENTOR.
Richard C. Rike
BY
D. D. McGraw
HIS ATTORNEY

United States Patent Office 3,169,372
Patented Feb. 16, 1965

3,169,372
MASTER CYLINDER PRIMARY CUP ANTI-EXTRUSION MECHANISM
Richard C. Rike, Dayton, Ohio, assignor to General Motors Corporation, Detroit, Mich., a corporation of Delaware
Filed June 27, 1963, Ser. No. 291,091
2 Claims. (Cl. 60—54.6)

The invention relates to an improvement in controlling the extrusion of primary cups in master cylinder assemblies, and more particularly to mechanism for maintaining a pressure differential between the pressure cylinder and the bypass port during pressurizing action of the master cylinder assembly so as to prevent extrusion of the primary cups into the bypass ports. The invention is an improvement over the invention disclosed and claimed in patent application Serial No. 291,092, entitled "Master Cylinder Primary Cup Anti-Extrusion Mechanism" and filed June 27, 1963 in the name of Elton S. Moyer. The disclosure of that application is herein incorporated by reference as if fully reproduced. In accordance with the invention as disclosed and claimed in the above noted application, pressure differential limiting mechanism is provided in the passage joining the master cylinder fluid reservoir and the bypass port connected to the pressurizing chamber. The invention which is disclosed and claimed herein provides a specific mechanism which is sensitive to the pressure initially generated in the pressurizing chamber and permits the buildup of pressure in the bypass port as the pressurizing chamber pressure increases so that there is insufficient pressure differential to cause the pressure in the pressurizing chamber to extrude the primary cup into the bypass port as it moves past that port. This increases the life of the primary cup and therefore the life of the master cylinder unit. The specific construction embodying the invention relates to a threaded passage in which a threaded insert is provided, with a capillary type restriction being formed by clearance between the threads of the insert and the passage. Such a construction will permit bypass flow through the bypass port while at the same time will prevent large pressure loss therethrough, thus limiting the pressure differential at the bypass port.

Figure 1:
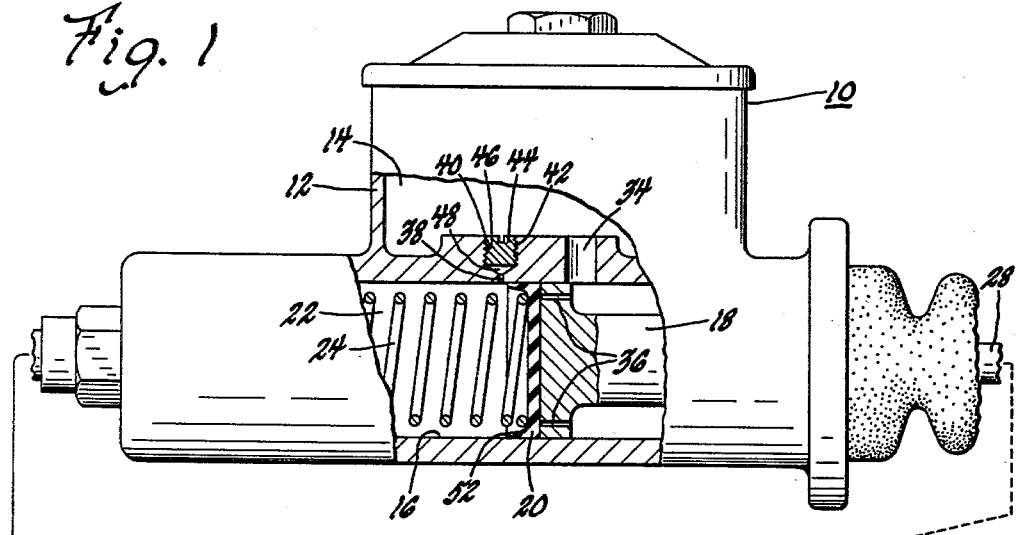
FIGURE 1 is a schematic illustration of a vehicle brake system having a master cylinder therein utilizing the invention.

The master cylinder assembly 10 includes a housing 12 having formed therein a fluid reservoir 14 and a master cylinder bore 16. A piston 18 having a primary cup 20 on the pressurizing end thereof is reciprocably received in bore 16 and cooperates therewith to define a pressurizing chamber 22. A piston return spring 24 urges cup 20 and piston 18 to the fully retracted position shown. The vehicle operator actuates the brake system by moving brake pedal 26 to actuate piston 18 through push rod 28. Fluid in chamber 22 is pressurized and conducted through the brake pressure conduit system 30 to the wheel cylinders 32 to acutate the vehicle brakes. A compensating port 34 fluid connects reservoir 14 with the portion of bore 16 behind the head of piston 18 and suitable piston passages 36 formed in the piston head cooperate with the check valve-like action of the primary cup 20 to compensate the brake pressure system for any loss of fluid which may take place.

Figure 2:
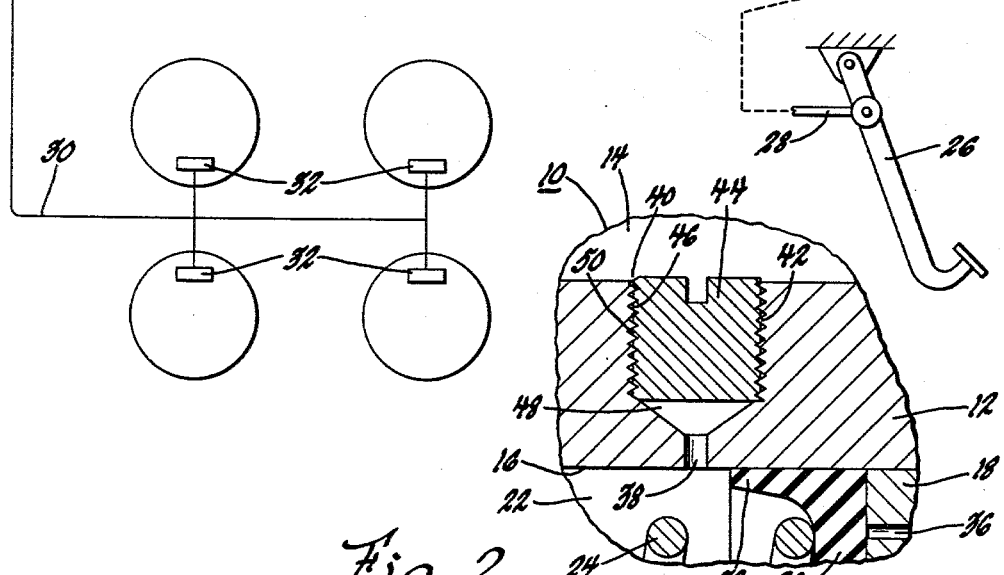
FIGURE 2 is an enlarged view of the bypass port construction embodying the invention.

A bypass port 38 is formed at the point where a passage 40 enters pressurizing chamber 22. Passage 40 connects reservoir 14 with chamber 22 through port 38. An enlarged passage section adjacent bypass port 38 is provided with an internal thread 42. A threaded insert 44 is secured in passage 40 so that its thread 46 is in mating relation to the thread 42 of the passage. The portion of passage 40 intermediate insert 44 and bypass port 38 forms a chamber 48. Threads 42 and 46 are so constructed as to provide a long tortuous fluid passage which acts as a capillary restriction joining chamber 48 and reservoir 14. This passage may be provided by any of several types of constructions and is illustrated in the drawing as being provided by having the insert thread 46 terminate before it is fully formed so that in cross section it has a truncated top. As shown in FIGURE 2, this provides a passage 50 which is generally triangular in cross section and spirals about the insert 44 so as to connect chamber 48 and reservoir 14.

When the vehicle operator actuates the brake pedal 26, cup 20 is moved to the left by piston 18 against the force of spring 24. The generation of pressure in chamber 22 commences, with bypass port 38 momentarily acting as a relief opening. Generally, however, the lip 52 of cup 20 covers bypass port 38 so that relatively little fluid is delivered under pressure from chamber 22 to the reservoir 14. Normally, after lip 52 is past port 38, the increased pressure in chamber 22 may cause the material of which cup 20 is formed to be extruded slightly into port 38, thus scoring the cup and eventually causing a failure of the cup. By utilizing mechanism embodying the invention, the fluid pressure being built up in chamber 22 is impressed in chamber 48 through port 38 but is prevented from being lost immediately due to the high restrictive nature of passage 50. Thus a slight pressure differential exists between chambers 22 and 48, but not so great a pressure differential as to cause cup 20 to extrude into bypass port 38 as it passes the port.

The pressure in chamber 48 will be dispensed through passage 50 in a short period of time after the closure of port 38, so that high pressure fluid is not trapped in chamber 48. By the time this occurs, however, there is no longer any danger of extrusion of the cup 20 into the port 38 under influence of pressure in chamber 22. Upon release of the brake pedal 26, spring 24 moves piston 18 and cup 20 to the right as shown in FIGURE 1, and bypass port 38 again connects reservoir 14 and chamber 22 through passage 50 so that the pressure remaining in chamber 22 is equalized through the port to the reservoir 14.

I claim:

1. A port control assembly comprising, a housing having a fluid pressurizing first chamber and a fluid reservoir second chamber and a passage formed therein fluid connecting said chambers for replenishing fluid in said first chamber from said second chamber and terminating in a port at said first chamber, thread means formed in the wall of said passage at said second chamber to a point spaced from said port, insert means having cooperable thread means thereon threaded in said passage, said thread means defining a pressure restrictive orifice fluid-connecting said port and said second chamber and sensitive to fluid pressure generated at a predetermined rate in said first chamber to cause a pressure buildup in said passage at said port to establish a maximum pressure differential between said first chamber and said passage at said port.

2. A master cylinder fluid pressurization assembly comprising a housing having a fluid reservoir and a bore receiving a pressurizing cup and piston therein to define a pressurizing chamber, a compensating port connecting said reservoir and said bore and a passage terminating in a bypass port connecting said reservoir and said chamber adjacent said cup when said cup and piston are retracted, and threaded means threaded into a cooperating threaded portion of said passage to provide a capillary pressure restriction intermediate the threads thereof between said reservoir and said bypass port sensitive to fluid pressure generated in said pressurizing chamber at the beginning of pressure generating movement of said cup and piston to establish a pressure in said passage at said bypass port to limit the pressure differential at said bypass port to prevent extrusion of said cup into said bypass port by said generated pressure.

References Cited in the file of this patent

UNITED STATES PATENTS

| | | |
|---|---|---|
| 2,112,356 | Bock | Mar. 29, 1938 |
| 2,501,108 | Wahlberg | Mar. 21, 1950 |
| 2,532,019 | Goldberg | Nov. 28, 1950 |
| 2,658,528 | Ifield | Nov. 10, 1953 |